United States Patent [19]

Margetak et al.

[11] Patent Number: 5,639,114
[45] Date of Patent: Jun. 17, 1997

[54] STEERING WHEEL WITH AIR BAG COVER AND HORN SWITCH

[75] Inventors: Glen P. Margetak; Michael E. Heidorn, both of Mesa, Ariz.

[73] Assignee: TRW Inc., Lyndhurst, Ohio

[21] Appl. No.: 557,433

[22] Filed: Nov. 14, 1995

[51] Int. Cl.$^6$ .................................................. B60R 21/20
[52] U.S. Cl. .................... 280/728.3; 200/61.54; 200/512
[58] Field of Search .................. 280/731, 728.3, 280/728.1; 200/61.54, 61.55, 61.56, 61.57, 512, 513, 517

[56] References Cited

U.S. PATENT DOCUMENTS

| | | | |
|---|---|---|---|
| 4,314,116 | 2/1982 | Gordon | 200/513 |
| 4,436,970 | 3/1984 | Swisher | 200/61.56 |
| 4,934,735 | 6/1990 | Embach | 280/731 |
| 5,036,169 | 7/1991 | Sakane | 200/61.54 |
| 5,085,462 | 2/1992 | Gualtier | 280/731 |
| 5,198,629 | 3/1993 | Hayashi et al. | 280/731 |
| 5,308,106 | 5/1994 | Heidorn | 280/728.3 |
| 5,338,059 | 8/1994 | Inoue et al. | 280/728.3 |
| 5,371,333 | 12/1994 | Kanai et al. | 200/61.54 |
| 5,399,819 | 3/1995 | Lang et al. | 200/61.54 |
| 5,499,841 | 3/1996 | Trojan et al. | 280/731 |

OTHER PUBLICATIONS

IBM Technical Disclosure Bulletin, vol. 12, No. 7, R. H. Harris and L. H. Sedaris, "Switch", p. 1130. Dec. 1969.

Primary Examiner—Brian L. Johnson
Assistant Examiner—Peter C. English
Attorney, Agent, or Firm—Tarolli, Sundheim, Covell, Tummino & Szabo

[57] ABSTRACT

An air bag module (22) is supported by a vehicle steering wheel (20) and includes an inflatable air bag (24). A rupturable cover (40) is supported by the steering wheel (20) to conceal the air bag (24) when the air bag is uninflated. A vehicle horn switch (60) is located between the cover (40) and the air bag (24) and includes a first conductor (80) connectable with one of a vehicle horn (62) and a source of electrical power (64). A second conductor (82) extends substantially parallel to and is spaced from the first conductor (80). The second conductor (82) is electrically connectable to the other of the source of electrical power (64) and the vehicle horn (62). The second conductor (82) is deflectable to contact the first conductor (80) to actuate the horn (62). A film structure (84, 86) encloses the first and second conductors (80, 82). First projections (100) are attached to the film structure (86). A plurality of force concentrators (120) on the cover (40) extend toward the switch (60) and cooperate with the first projections (100) to concentrate force applied to the cover (40) to an area of the film structure (86) to deflect the second conductor (82) into electrical contact with the first conductor (80).

4 Claims, 5 Drawing Sheets

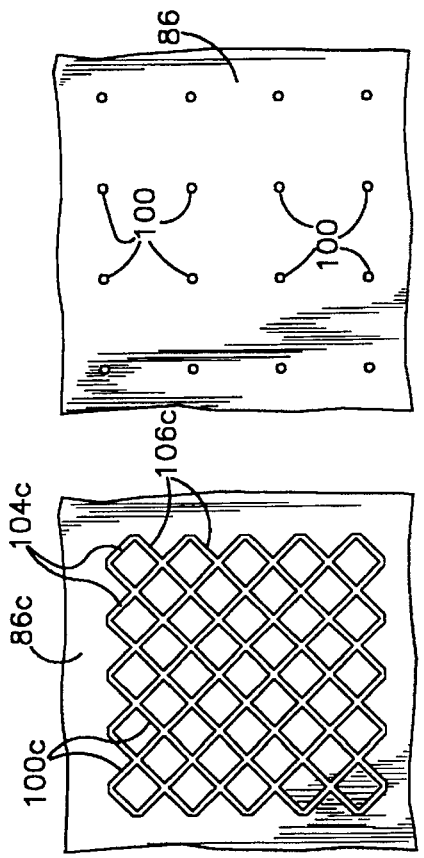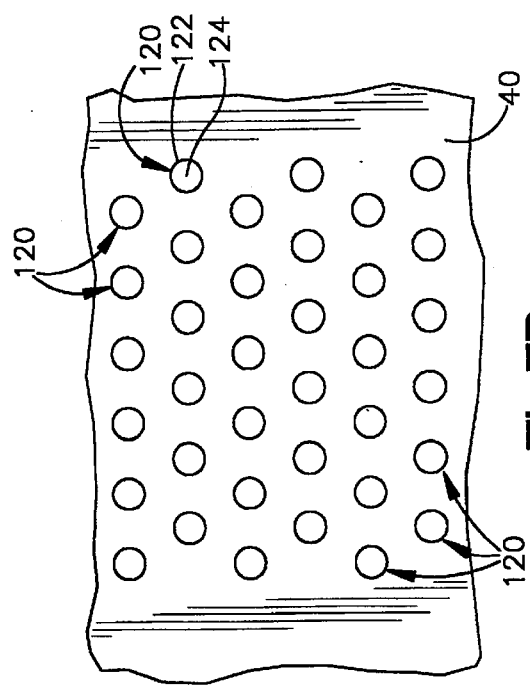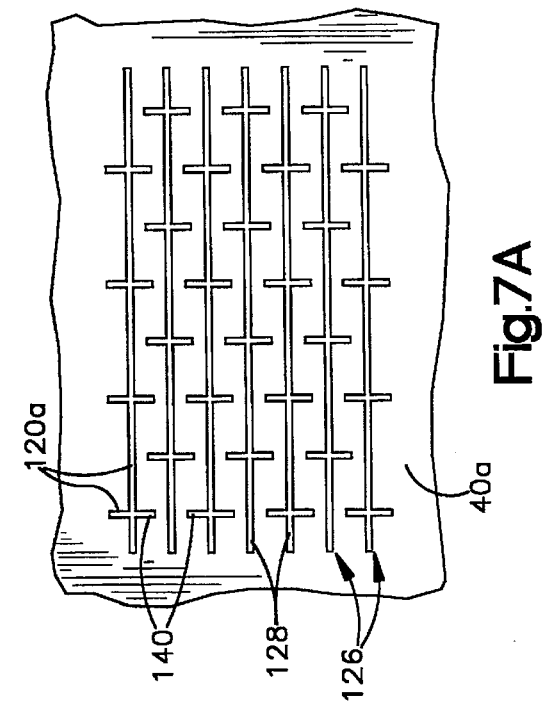

STEERING WHEEL WITH AIR BAG COVER AND HORN SWITCH

BACKGROUND OF THE INVENTION

1. Technical Field

The present invention relates to an apparatus including a steering wheel, an air bag module supported by the steering wheel, and a vehicle horn switch.

2. Description of the Prior Art

A driver's side air bag module is typically mounted to a vehicle steering wheel. The air bag module typically includes a horn switch. One type of known horn switch is a membrane switch which is located inside of a cover of the air bag module.

The air bag cover is often made from a soft and compressible material. A portion of an outer surface of the air bag cover is deflected by applying a force to the cover to actuate the horn switch. However, when the cover is depressed, for example by a palm of an operator's hand, the force applied to the cover acts on a relatively large surface area and a relatively large force may have to be applied to actuate the horn switch.

SUMMARY OF THE INVENTION

The present invention is directed to an apparatus for actuating a vehicle horn switch. The apparatus comprises a vehicle steering wheel. An air bag module is supported by the steering wheel. The air bag module includes an inflatable air bag and a rupturable cover. The cover is supported by the steering wheel to conceal the air bag when the air bag is uninflated. The cover ruptures upon inflation of the air bag.

A membrane switch is located between the cover and the air bag. The switch comprises a first conductor which is electrically connectable with one of a vehicle horn and an electrical power supply. A second conductor extends substantially parallel to and is spaced from the first conductor. The second conductor is electrically connectable to the other of the electrical power supply and the vehicle horn. The second conductor is deflectable to contact the first conductor and close an electrical circuit to actuate the vehicle horn.

A film structure encloses the first and second conductors. First projections are disposed on an exterior surface of the film structure. A plurality of force concentrators extend from the cover in a direction toward the switch. The force concentrators cooperate with the first projections to concentrate force applied to the cover to an area of the film structure to deflect the second conductor into electrical contact with the first conductor.

The first projections on the exterior surface of the film structure are made from a dielectric material and extend in a direction toward the cover for engagement with at least one of the force concentrators. Preferably, dielectric second projections are located on one of the conductors and extend in a direction toward the other conductor. The first projections are offset from the dielectric second projections. The projections have a variety of shapes and may be circular in cross-section. The projections may also be X-shaped or be a plurality of orthogonal ribs.

The force concentrators may be a plurality of cylindrical members. Each cylindrical member has a side surface projecting from the cover and a circular end surface for engaging a portion of the switch. Preferably a force concentrator engages a projection on the exterior surface of the film structure. The force concentrators may include a plurality of ribs projecting from the cover. The ribs include a plurality of parallel first rib portions and a plurality of parallel second rib portions extending transverse to the first rib portions. Preferably, the force concentrators are aligned with the first projections.

BRIEF DESCRIPTION OF THE DRAWINGS

Further features and advantages of the present invention will become apparent to those skilled in the art to which the present invention relates from reading the following specification with reference to the accompanying drawings, in which:

FIGS. 6A–6D are alternate plan views of patterns of dielectric projections extending from the horn switch, taken along line 6D—6D in FIG. 2;

FIGS. 7A–7B are alternate plan views of patterns of force concentrators extending from a cover of the air bag module, taken along line 7B—7B in FIG. 4.

DESCRIPTION OF PREFERRED EMBODIMENTS

Figure 1:
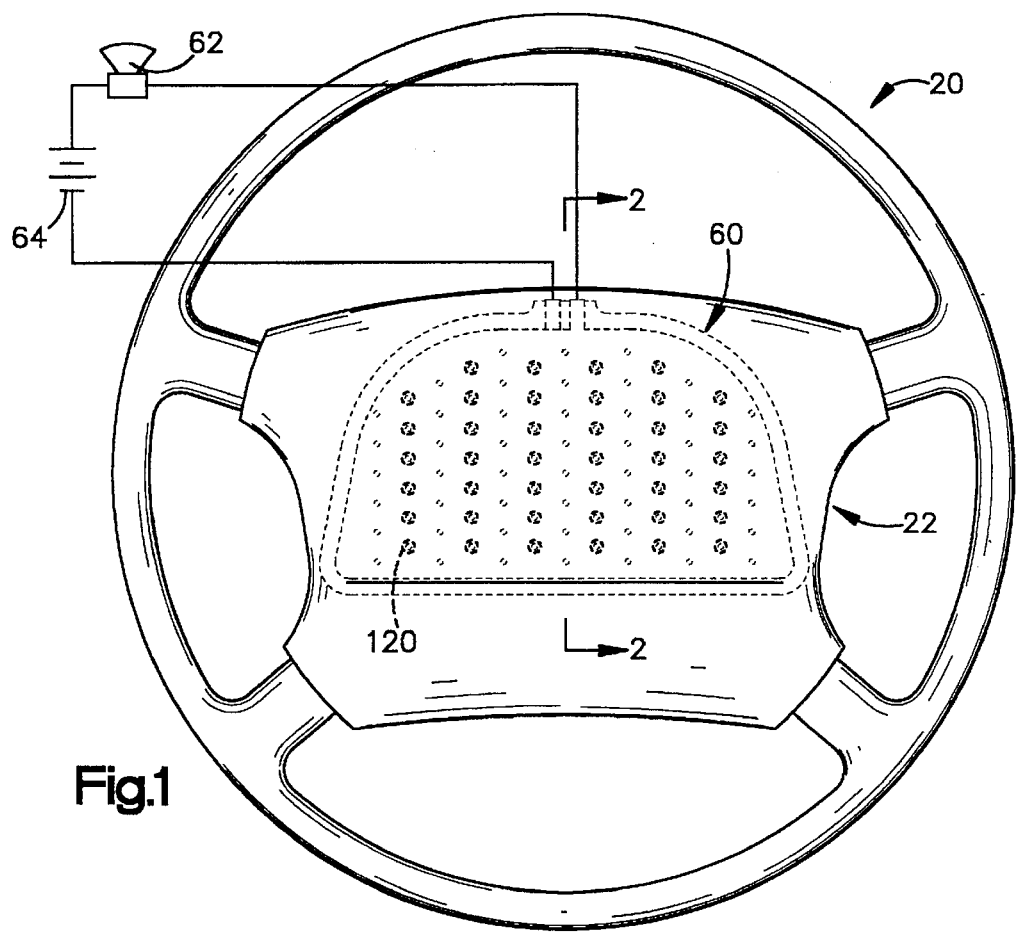
FIG. 1 is a schematic view of a vehicle steering wheel and an air bag module having a horn switch.

A vehicle steering wheel 20 is illustrated in FIG. 1. The steering wheel 20 supports an air bag module 22. The air bag module 22 includes an air bag 24 (FIG. 2) and an inflator 26 which provides a source of inflation fluid to inflate the air bag.

Figure 2:
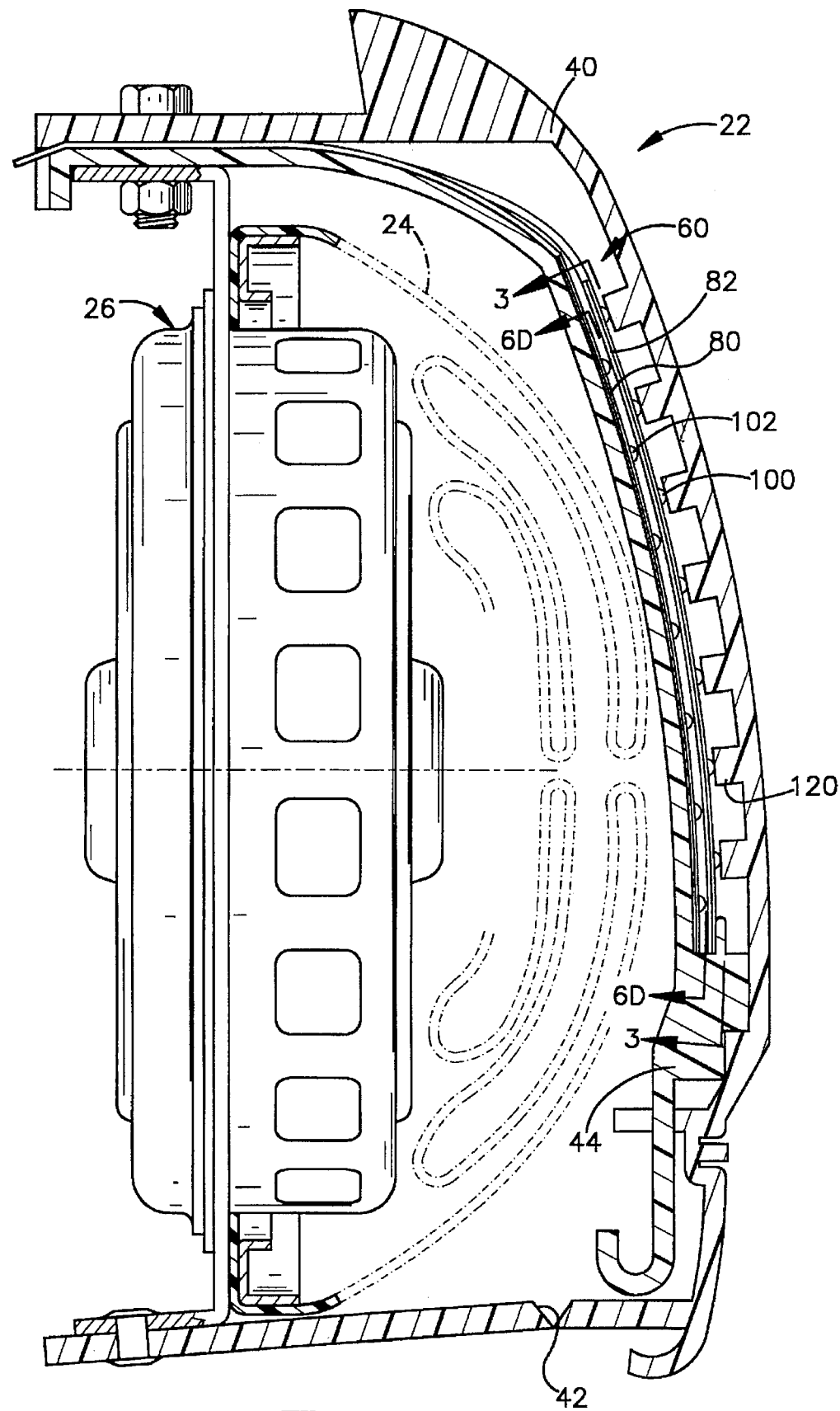
FIG. 2 is a sectional view of the air bag module of FIG. 1, taken approximately along the line 2—2 in FIG. 1.
Figure 4:
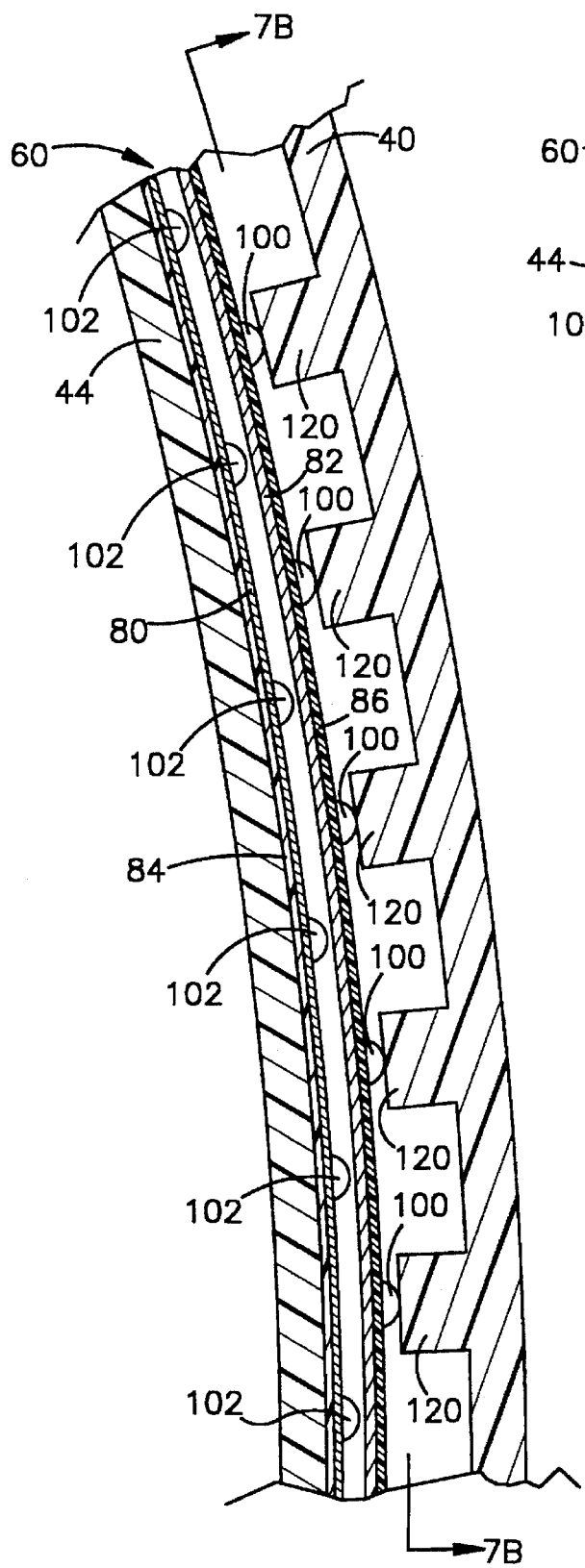
FIG. 4 is an enlarged sectional view of a portion of the air bag module of FIG. 2.

The air bag 24 is inflatable from an uninflated or stored condition, as illustrated in FIG. 2, to an inflated condition extending from the steering wheel 20. Upon inflation, the air bag 24 extends into an occupant compartment of the vehicle. The inflated air bag 24 is located between the steering wheel 20 and an operator of the vehicle. The inflated air bag 24 helps restrain and protect the operator from forceful impact with the steering wheel 20 or other parts of the vehicle near the steering wheel.

The inflator 26 may contain an ignitable gas generating material which, when ignited, rapidly produces a relatively large volume of gas. The inflator 26 may alternately contain a stored quantity of pressurized fluid, a combination of pressurized fluid and ignitable material which heats the fluid, or a mixture of gases including a combustible gas portion which heats other portions of the mixture of gases to inflate the air bag.

The air bag module 22 also includes an outer cover 40. The outer cover 40 fits over a deployment opening in the steering wheel 20 to conceal the air bag 24 and other components of the air bag module 22 from view. The outer cover 40 is molded from plastic that is flexible, deflectable and compressible. The outer cover 40 has a rupturable portion defined by a stress riser 42. The stress riser 42 ruptures to open the outer cover 40 and release the air bag 24 from the steering wheel 20 into the vehicle occupant compartment. When the inflator 26 is actuated, a volume of inflation fluid is released to inflate the air bag 24. As the air bag 24 inflates, it applies force to the outer cover 40 to break the stress riser 42. The air bag 24, when inflated, extends away from the steering wheel 20.

Figure 3:
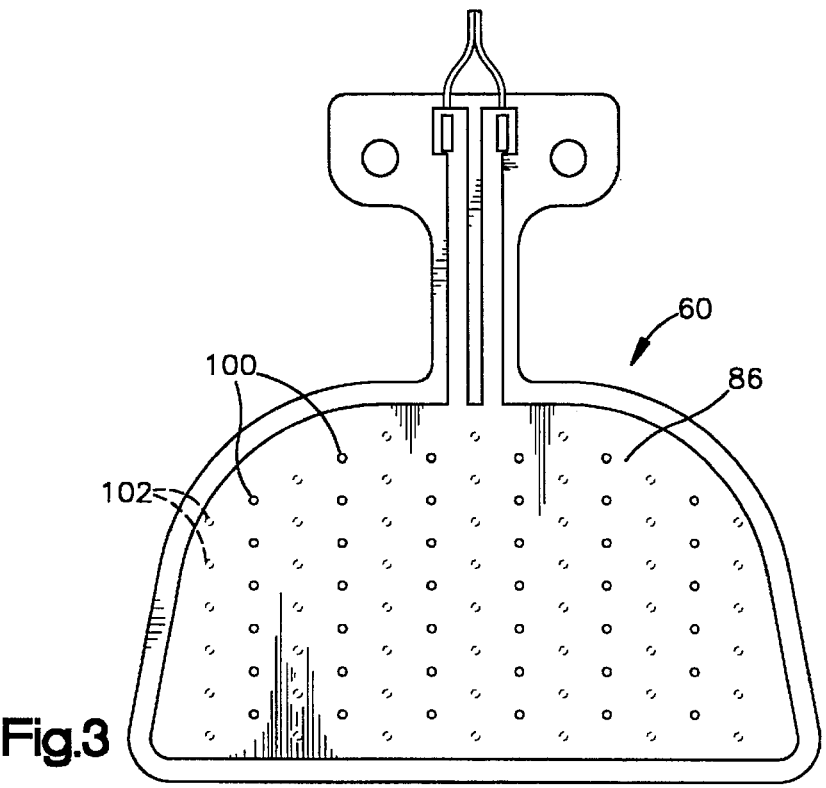
FIG. 3 is a plan view of a portion of the horn switch of FIG. 2, taken approximately along line 3—3 in FIG. 2.

The air bag module 22 also includes a relatively rigid inner cover 44 which is spaced from the outer cover 40. The air bag module 22 further includes an actuatable horn switch 60 (FIG. 3) for actuating a horn 62 (FIG. 1) of the vehicle. The horn switch 60 is relatively flat and is located between the outer cover 40 and the inner cover 44 of the air bag module 22. The horn switch 60 is also located between the air bag 24 and the outer cover 40 of the air bag module 22.

The horn switch 60 is connected with a power supply 64 of the vehicle, such as a battery or alternator. The horn 62 and the power supply 64 are part of an electrical circuit which includes the horn switch 60 in a normally open condition. When the horn switch 60 closes, the electrical circuit is complete and electrical power is delivered to the horn 62 to actuate the horn.

Figure 5:
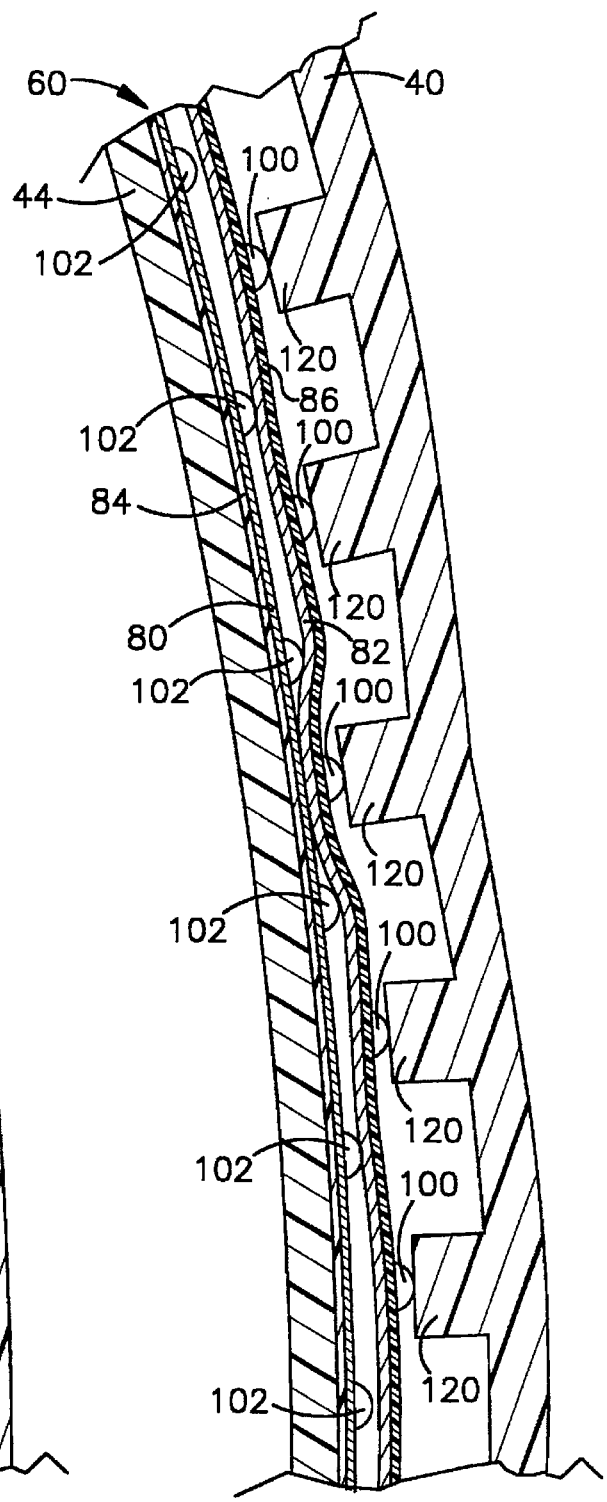
FIG. 5 is a view similar to FIG. 4 with parts illustrated in different positions.

The horn switch 60 is preferably a membrane switch which includes a pair of relatively thin and flat electrical conductors 80, 82 (FIG. 2). Preferably, each of the conductors 80, 82 is made from a resiliently deflectable copper sheet. The conductors 80, 82 extend substantially parallel to each other. The conductor 80 of the horn switch 60 is supported by the inner cover 44. The conductor 82 is spaced from the conductor 80 to define an electrically non-conductive or open switch condition. A portion of the conductor 82 is deflectable into electrically conductive contact with the conductor 80, as illustrated in FIG. 5, to define a closed switch condition.

The conductors 80, 82 are encapsulated by film material to insulate the exterior surfaces of the horn switch 60 electrically and to seal the conductors from moisture, dirt, debris and the like. The film material is preferably a polyester or Mylar material. A film layer 84 of the material is attached to the conductor 80 by suitable means, such as an adhesive. A film layer 86 of the material is attached to the conductor 82.

The horn switch 60 also includes a plurality of mound shaped dielectric projections 100 which are located on the exterior surface of the film layer 86 of the horn switch. The dielectric projections 100 are preferably formed separate from the film layer 86 and attached to the film layer. It will be apparent that the dielectric projections 100 could be molded in one piece with the film layer 86. The dielectric projections have a circular cross-section in a plane extending parallel to the film layer 86. The dielectric projections 100 extend in a direction toward the outer cover 40. Another plurality of dielectric projections 102 are attached to the conductor 80 inside the horn switch 60. The dielectric projections 102 extend in a direction toward the conductor 82.

The dielectric projections 100 are preferably offset from the dielectric projections 102 in a direction parallel to the extent of the conductors 80, 82. This offset assures that the dielectric projections 100, 102 do not overlie one another. Each of the dielectric projections 100 is located approximately midway between an adjacent pair of dielectric projections 102. It will be apparent that the dielectric projections 100 could be located on the exterior surface of either the film layer 84 or the film layer 86. It will also be apparent that the plurality of projections 102 could be located on the inner surface of the conductor 80 or the inner surface of the conductor 82. When one of the conductors 80, 82 is deflected toward the other conductor and contact is made, the horn switch 60 closes and the electrical circuit is completed to deliver power from the power source 64 to actuate the horn 62.

The outer cover 40 includes a plurality of force concentrators 120 which are molded as part of the outer cover. The force concentrators 120 extend from a surface of the outer cover which faces the horn switch 60. Each of the force concentrators 120 is preferably cylindrical in shape with a side surface 122 (FIG. 7B) extending from the inside surface of the outer cover 40. Each of the force concentrators 120 has a circular end surface 124 for engaging a dielectric projection 100. The area of the end surface 124 is greater than the area to be engaged on a dielectric projection 100. The force concentrators 120 of the outer cover 40 cooperate with the dielectric projections 100, 102 of the horn switch to concentrate a force applied to the outer cover to close the horn switch. Preferably, the force concentrators 120 engage the dielectric projections 100 located on the outside of the horn switch 60.

As viewed in FIG. 5, upon deflection of the outer cover 40, the force concentrators 120 engage the dielectric projections 100. A force is applied to the film layer 86 and to the conductor 82 to deflect the conductor resiliently into contact with the conductor 80. The force concentrators 120 move the dielectric projections 100 in a direction toward the conductor 80 midway between the dielectric projections 102. The force concentrators 120 and the dielectric projections 100, 102 locally concentrate a force which is applied over a relatively large area of the outer cover 40, for example by an open hand or palm of a vehicle operator, to a relatively small area of the conductor 82 to deflect the conductor 82 into contact with the conductor 80.

In FIGS. 6A–6D various examples are given for the dielectric projections used on the horn switch 60. The dielectric projections 100 (FIG. 6D) have a mound shape and are arranged in an evenly spaced pattern of rows and columns. Alternate shapes and patterns of the dielectric projections 100 are illustrated in FIGS. 6A–6C and are given the same reference numeral with a suffix "a", "b" or "c".

For example, the dielectric projections 100a (FIG. 6A) have a cross or X shape and project from film layer 86a and are arranged in any evenly spaced pattern of rows and columns. Dielectric projections 100b (FIG. 6B) project from film layer 86b and are shaped as continuous parallel ribs 104b in a pattern extending normal to continuous parallel ribs 106b. Dielectric projections 100c (FIG. 6C) project from the film layer 86c and are shaped as parallel ribs 104c in a pattern extending normal to continuous parallel ribs 106c, but in a different relative orientation than the dielectric projections 100b.

The pattern of the dielectric projections illustrated in FIGS. 6A–6D is used for the dielectric projections 100 on the exterior side of the horn switch 60 as well as for the dielectric projections 102 in the interior of the horn switch. Any pattern of the dielectric projections 100, 100a, 100b or 100c may, however, be used on the exterior of the horn switch 60 as the shape and pattern for the dielectric projections 102 in the interior of the horn switch. The pattern of dielectric projections 100, 100a, 100b or 100c do not necessarily have to correspond to the pattern used for the dielectric projections 102.

In FIGS. 7A and 7B, different alternate structures of force concentrators 120, 120a for the inside of the outer cover 40 are illustrated. It will be apparent that any combination of the patterns of the dielectric projections 100, 102 and the force concentrators 120, including patterns which are not shown in FIGS. 6–7, may be used and in any orientation, alignment or offset.

For example, the concentrators 120a include a plurality of ribs 126 projecting from the inside surface of the cover 40a. The ribs 126 include a plurality of parallel and continuous rib portions 128. A plurality of parallel and discrete rib portions 140 extend transverse to the continuous rib portions 128.

Figure 8:
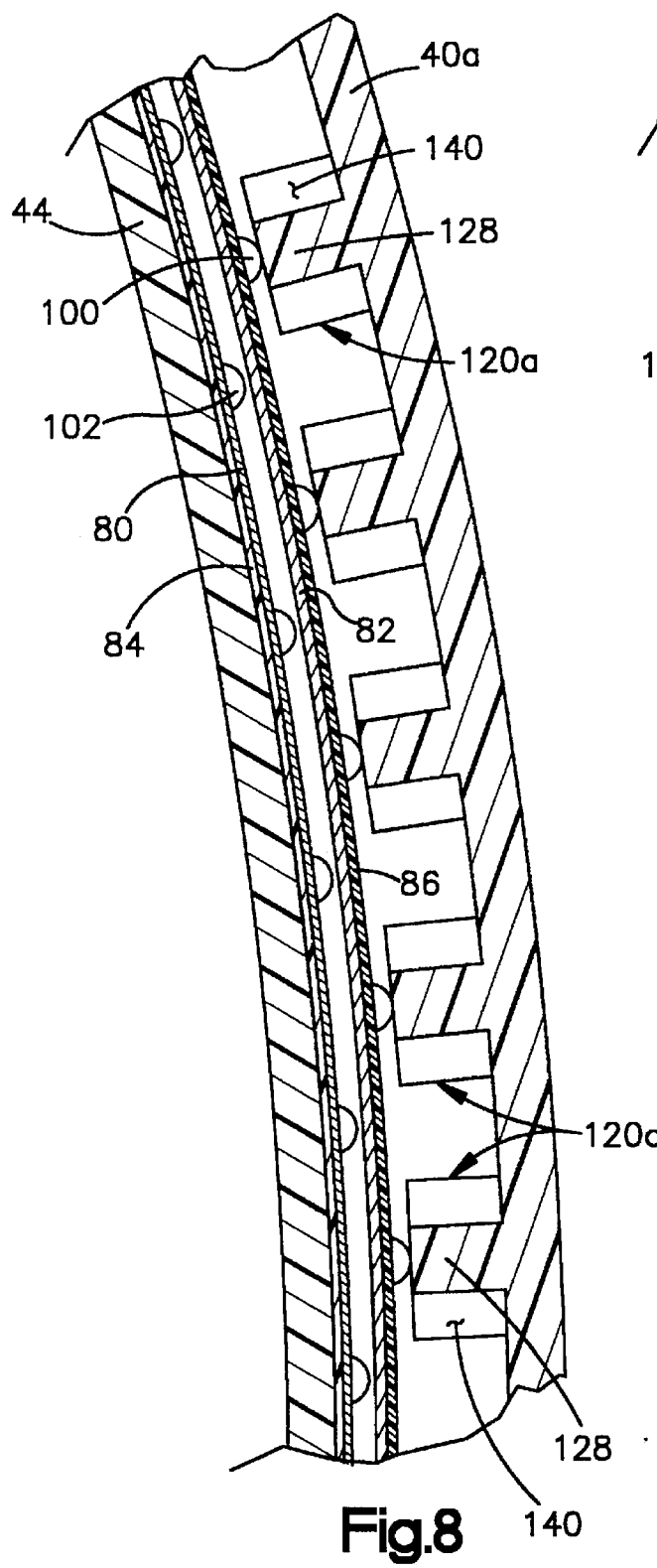
FIGS. 8–9 are views similar to FIG. 4 illustrating alternate arrangements of the force concentrators and the dielectric projections.
Figure 9:
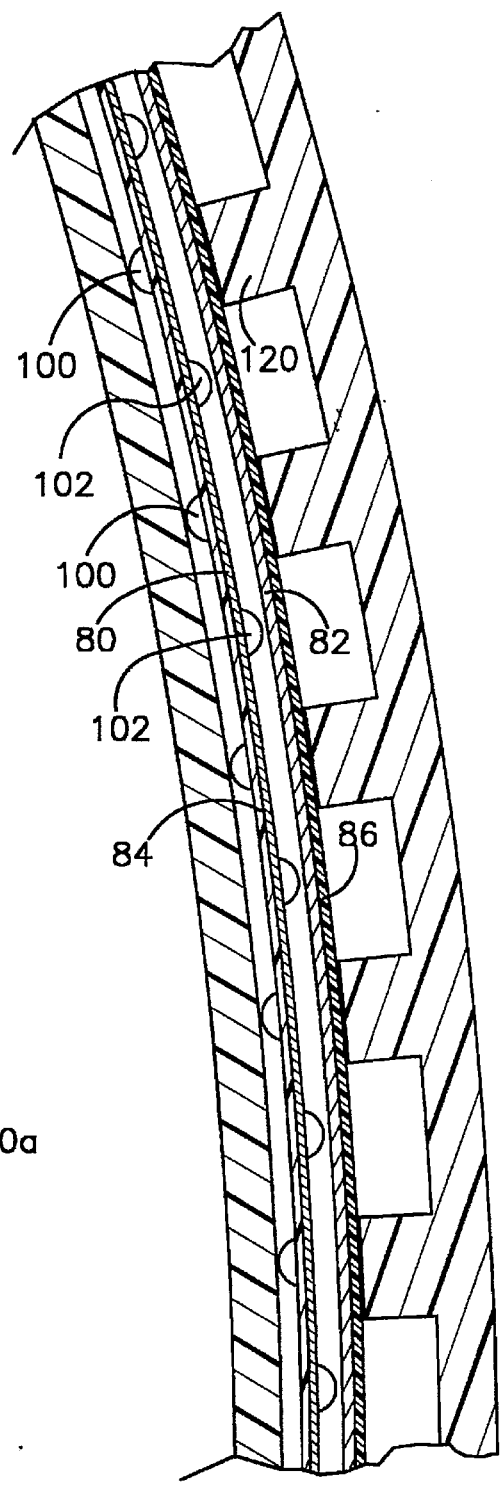

FIGS. 8 and 9 illustrate alternate combinations of the dielectric projections 100, 102 and the force concentrators 120. In FIG. 8, the ribbed force concentrators 120a are aligned with one particular pattern of dielectric projections 100. The location where the continuous rib portions 128 and the discrete rib portions 140 of the ribs 126 meet preferably overlies a dielectric projection 100. In FIG. 9, the dielectric projections 100 located on the exterior surface of the film layer 84 face in a direction away from the outer cover 40. The dielectric projections 100 are not engageable with the force concentrators 120. The force concentrators 120 are offset from and located between the dielectric projections 102.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

first and second vehicle horn switch conductors which are movable into and out of electrically conductive contact with each other;

a plurality of first dielectric projections which project between said first and second conductors;

a layer of electrically insulating material overlying said second conductor;

a plurality of second dielectric projections which project outward from said layer, said second projections being offset from said first projections; and a resiliently deflectable air bag cover overlying said layer, said air bag cover having an inner surface and a plurality of force concentrators projecting inward from said inner surface toward said second projections;

said force concentrators being movable inward against said second projections upon inward deflection of said air bag cover, whereby said force concentrators deflect said second conductor into contact with said first conductor at locations offset from said first projections;

each of said force concentrators being movable inward against only a single corresponding one of said second projections.

2. An apparatus comprising:

first and second vehicle horn switch conductors which are movable into and out of electrically conductive contact with each other;

a plurality of first dielectric projections which project between said first and second conductors;

a layer of electrically insulating material overlying said second conductor;

a plurality of second dielectric projections which project outward from said layer, said second projections being offset from said first projections; and a resiliently deflectable air bag cover overlying said layer, said air bag cover having an inner surface and a plurality of force concentrators projecting inward from said inner surface toward said second projections;

said force concentrators being movable inward against said second projections upon inward deflection of said air bag cover, whereby said force concentrators deflect said second conductor into contact with said first conductor at locations offset from said first projections;

said first and second projections being arranged in rows, each of said second projections being located between an adjacent pair of said first projections, said force concentrators comprising elongated ribs which extend longitudinally over corresponding rows of said second projections and which are movable inward against said corresponding rows of said second projections upon said inward deflection of said air bag cover, whereby each of said ribs deflects said second conductor into contact with said first conductor at locations between said adjacent pairs of said first projections.

3. An apparatus as defined in claim 2 wherein said ribs have continuous portions extending longitudinally over said rows of said second projections and further have discrete portions transverse to said continuous portions, each of said discrete portions intersecting one of said continuous portions adjacent to a corresponding one of said second projections.

4. An apparatus as defined in claim 3 wherein each of said continuous portions of said ribs extends in a straight line.

* * * * *